Figure 1:
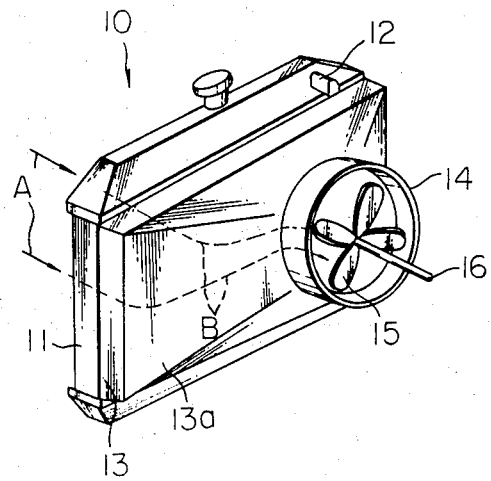

United States Patent [19]
Izumi

[11] 3,777,808
[45] Dec. 11, 1973

[54] COOLING ARRANGEMENT MOUNTED ON A MOTOR VEHICLE
[75] Inventor: Masao Izumi, Tokyo, Japan
[73] Assignee: Nissan Motor Company, Limited, Kanagawa-ku, Yokohama City, Japan
[22] Filed: Mar. 29, 1972
[21] Appl. No.: 239,138

[30] Foreign Application Priority Data
Oct. 23, 1971   Japan..........................46/98347

[52] U.S. Cl...................... 165/39, 165/51, 236/35.2
[51] Int. Cl............................................. B60h 1/10
[58] Field of Search............................ 234/35, 35.2; 165/11, 35, 39, 51, 42

[56]   References Cited
   UNITED STATES PATENTS
1,820,091   8/1931   Reavis................. 236/35.2
3,552,483   1/1971   North................... 125/11

*Primary Examiner*—Charles Sukalo
*Attorney*—John Lezdey et al.

[57]   ABSTRACT

A cooling arrangement for a motor vehicle which comprises a radiator connected to an engine of the motor vehicle, a shroud with a fan arrangement provided behind the radiator for drawing cooling air through the radiator. The shroud has provided at its back wall an aperture with a plurality of doors which shut or open the aperture to control the air flow in dependence on the engine temperature, atmospheric temperature, vehicle speed etc.

1 Claim, 2 Drawing Figures

PATENTED DEC 11 1973   3,777,808

COOLING ARRANGEMENT MOUNTED ON A MOTOR VEHICLE

This invention relates to a cooling arrangement for a motor vehicle and more particularly to a cooling arrangement which has a fan shroud effective for drawing through a radiator a sufficient amount of air flow.

Conventional engine cooling arrangement for a motor vehicle includes a radiator connected to the engine for cooling a liquid coolant passed through the engine, radiator having a plurality of air passages for passing therethrough ambient air, and a fan shroud combined with the radiator for drawing through the radiator a sufficient amount of cooling air even when the motor vehicle runs slowly. The fan shroud has an inlet communicating with the air passages of the radiator, and an outlet open to ambient atmosphere having provided therein a fan arrangement which draws the cooling air through the air passages of the radiator and the fan shroud.

A problem still has been encountered in that when the motor vehicle runs at a high speed the fan shroud undesiredly obstructs the flow of the cooling air because of the small blast area of the outlet thereof and the limited capability of drawing the air of the fan arrangement positioned in the inlet.

It is therefore an object of this invention to provide an improved cooling arrangement for a motor vehicle engine.

It is another object of the invention to provide an engine cooling arrangement capable of passing therethrough a sufficient amount of cooling air at any speed of the vehicle.

It is another object of the invention to provide an engine cooling arrangement effective for reducing windage loss thereof when the vehicle runs at a high speed.

Figure 2:
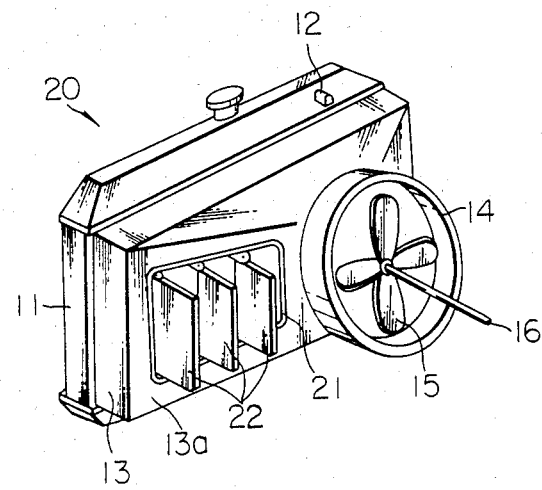

Further and another objects of the invention will be apparent from the following description taken in connection with the accompanying drawings wherein:

FIG. 1 is a view showing a conventional cooling arrangement for a motor vehicle; and FIG. 2 is a schematic view showing a cooling arrangement according to this invention.

Corresponding characters of reference designates like elements in the views.

Referring now to the drawings and particularly to FIG. 1 thereof, there is illustrated a conventional cooling arrangement 10 which comprises a radiator 11 provided in front of the engine thereby to pass air through a plurality of air passages of the radiator 11 as the vehicle runs in the forward direction. The radiator 11 communicates through a conduit 12 with the engine so as to receive the liquid coolant passed through the engine. Behind the radiator 11 is provided a shroud 13 having an inlet communicating with the air passages of the radiator 11 and an outlet 14 opened to the atmosphere. The cooling air passed through the radiator 11 is drawn by a fan 15 positioned adjacent to or in the outlet 14 with a rotary shaft 16 which may be driven through a suitable means by the engine crank shaft or an electric motor (not shown). The cooling air admitted to the radiator 11 as indicated by arrows A passes through the radiator 11 and the shroud 13, as indicated by broken lines B, by the aid of the fan 15. The shroud 13 with the fan 15 is therefore effective for maintaining a sufficient amount of air flow through the radiator 11 even when the vehicle runs at a low speed. In this instance, it is to be noted that since the cooling arrangement should be placed in a limited space in the front portion of the vehicle and the area of the outlet 14 should be limited in order for the effective operation of the fan 15, the shroud 13 has a back wall 13a angled from the longitudinal central axis of the vehicle. The wall 13a undesiredly obstructs the air flow through the radiator 11 and the shroud 13 when the vehicle runs at a relatively high speed. The conventional cooling arrangement 10 is therefore not fully acceptable.

According to this invention, an improved cooling arrangement is provided which can avoid such problem as above-mentioned.

In FIG. 2, a cooling arrangement according to this invention is shown, generally designated by 20, which comprises the same parts and construction as the cooling arrangement 10 of FIG. 1, except that the shroud 13 has provided at its end wall 13a with an aperture 21. At least one, preferably a plurality of, doors 22 are hinged to the wall 13a so as to shut or open the aperture 21 in accordance with various conditions of the vehicle. Of course, the doors 22 may be replaced by other closure means, if desired.

The doors 22 are adapted to swing to shut or open the aperture 21 through a suitable linkage in accordance with various conditions such as the atmospheric temperature, vehicle speed, liquid coolant temperature etc. When, for example, the vehicle runs at a high speed and accordingly the end wall 13a causes to increase the windage loss of the vehicle or reduces the amount of the air flow through the radiator, the doors 22 are actuated to open the aperture 21 so that the cooling air smoothly passes through the radiator 11 and the shroud 13. When, however, the engine temperature or atmospheric temperature is relatively low, the doors are actuated to shut the aperture 21 so as to prevent the engine from over-cooling, even when the vehicle runs at a high speed. When, on the contrary, the vehicle runs at a relatively low speed, the doors 22 are actuated to shut the aperture 21 so that the cooling air flow through the shroud 13 in the same manner as in the conventional one of FIG. 1. The doors 22 may be actuated by a suitable electric or mechanical system (not shown) and, if desired, the doors 22 may be actuated by a spring (not shown) for making doors 22 to close the aperture 21 when the wind pressure exerted on the doors 22 is lower than a certain value. Furthermore, the doors 22 may be manually actuated through a suitable linkage not shown.

It is now apparent from the foregoing description that the cooling arrangement according to this invention is capable of regulating the amount of air flow passing therethrough in accordance with various conditions and effective for reducing the windage loss of the cooling arrangement when the vehicle runs at a high speed.

It will be understood that the invention is not to be limited to the exact construction shown and described and that various changes and modifications may be made without departing from the spirit and scope of the invention, as defined in the appended claims.

I claim:

1. A cooling arrangement for a motor vehicle having an engine comprising:

a radiator operatively connected to said engine for cooling a liquid coolant passed through said engine, said radiator having a plurality of air passages for allowing ambient air to pass therethrough;

a shroud having an inlet communicating with said air passages of the radiator, an outlet open to ambient atmosphere and an aperture formed in the wall thereof adjacent to said outlet;

a fan arrangement provided in said outlet of said radiator for drawing said ambient air through said radiator and said shroud into said outlet;

means defining an aperture in said shroud adjacent said outlet; and a plurality of doors mounted through hinges bearings on said wall in said aperature for selectively opening and shutting said aperature in accordance with engine temperature, atmospheric temperature and vehicle speed.

* * * * *